(12) United States Patent
Fulton

(10) Patent No.: US 9,489,405 B2
(45) Date of Patent: Nov. 8, 2016

(54) GEOMETRIC ARRAY DATA STRUCTURE

(75) Inventor: Michael S. Fulton, Maple Ridge, CA (US)

(73) Assignee: International Business Machines Corporation, Armonk, NY (US)

( * ) Notice: Subject to any disclaimer, the term of this patent is extended or adjusted under 35 U.S.C. 154(b) by 1283 days.

(21) Appl. No.: 13/168,937

(22) Filed: Jun. 25, 2011

(65) Prior Publication Data

US 2012/0331257 A1    Dec. 27, 2012

(51) Int. Cl.
*G06F 17/30* (2006.01)
(52) U.S. Cl.
CPC .............................. *G06F 17/30312* (2013.01)
(58) Field of Classification Search
None
See application file for complete search history.

(56) References Cited

U.S. PATENT DOCUMENTS

| | | | |
|---|---|---|---|
| 6,094,715 A | 7/2000 | Wilkinson et al. | |
| 7,035,989 B1* | 4/2006 | Hinker | G06F 12/023 711/171 |
| 7,533,221 B1 | 5/2009 | Doherty et al. | |
| 7,596,789 B2* | 9/2009 | Olesinski et al. | 718/102 |
| 2003/0182352 A1* | 9/2003 | Olesinski et al. | 709/102 |

FOREIGN PATENT DOCUMENTS

| | | |
|---|---|---|
| CN | 101833476 A | 9/2010 |
| WO | WO2010121228 A2 | 10/2010 |

OTHER PUBLICATIONS

Riley, et al., "High Performance Java Codes for Computational Fluid Dynamics," Proceedings of the 2001 Joint ACM-ISCOPE Conference on Java Grande, 2001.
Batista, et al., "Parallel Geometric Algorithms for Multi-Core Computers," Proceedings of the 25th Annual Symposium on Computational Geometry, 2009.
Sundell, et al., "Fast and Lock-Free Concurrent Priority Queues for Multi-Thread Systems," In Proceedings of the 17th International Parallel and Distributed Processing Symposium, 2003.

\* cited by examiner

*Primary Examiner* — Kevin Verbrugge
(74) *Attorney, Agent, or Firm* — Nelson and Nelson; Daniel P. Nelson; Alexis V. Nelson

(57) ABSTRACT

A method for implementing a geometric array in a computing environment is disclosed. In one embodiment, such a method includes providing an array of slots, where each slot is configured to store a pointer. Each pointer in the array points to a block of elements. Each pointer with the exception of the first pointer in the array points to a block of elements that is twice as large as the block of elements associated with the preceding pointer. Such a structure allows the geometric array to grow by simply adding a pointer to the array that points to a new block of elements that is twice as large as the block of elements associated with the preceding pointer in the array. A corresponding computer program product, as well as a method for accessing data in the geometric array, are also disclosed.

9 Claims, 7 Drawing Sheets

GEOMETRIC ARRAY DATA STRUCTURE

BACKGROUND

1. Field of the Invention

This invention relates to apparatus and methods for storing and organizing data in a computer system.

2. Background of the Invention

Applications often need to be able to work with variable-sized collections of data. Such collections of data could have zero, one, or potentially millions of data entries. Well-written applications typically provide collections that can grow as the needs of the application change. For applications that are multi-threaded, there are additional complexities to efficiently manage collections because data entries may be added or updated in such collections by different threads simultaneously. As a result, in multi-threaded applications, the underlying collections typically require synchronization (e.g., locks, etc.) of some form to ensure that data integrity is maintained.

These issues are addressed today with a variety of collections that have different performance characteristics. One of the most convenient and oft-used collections is the simple one-dimensional array. The downside of such an array is that, when the array is full, a new array must be allocated, and the data in the old array must be copied to the new array. In a multi-threaded environment, all threads that need to add data to the collection will need to wait for the copy to complete, or alternately, write to a secondary array in the meantime. This can substantially hinder performance in the multi-threaded environment. A two-dimensional (or higher) form of array may also be used. However, such arrays are simply mapped to one-dimensional arrays by compilers. Thus, such arrays have many if not all of the shortcomings discussed above with respect to one-dimensional arrays.

In view of the foregoing, what is needed is an array data structure that overcomes the shortcomings of conventional arrays, such as single or multi-dimensional arrays. Ideally, such an array data structure could grow over time while avoiding or minimizing the use locks or other synchronization mechanisms to access data therein.

SUMMARY

The invention has been developed in response to the present state of the art and, in particular, in response to the problems and needs in the art that have not yet been fully solved by currently available apparatus and methods. Accordingly, the invention has been developed to provide a method for implementing a geometric array, as well as a method for efficiently accessing data in the geometric array. The features and advantages of the invention will become more fully apparent from the following description and appended claims, or may be learned by practice of the invention as set forth hereinafter.

Consistent with the foregoing, a method for implementing a geometric array in a computing environment is disclosed herein. In one embodiment, such a method includes providing an array of slots, where each slot is configured to store a pointer. Each pointer in the array points to a block of elements. Each pointer with the exception of the first pointer in the array points to a block of elements that is twice as large as the block of elements associated with the preceding pointer. Such a structure allows the geometric array to grow by simply adding a pointer to the array that points to a new block of elements. This new block of elements is twice as large as the block of elements associated with the preceding pointer in the array.

A method for accessing data in such a geometric array is also disclosed. In one embodiment, a method for accessing the $i^{th}$ element in such a geometric array includes calculating a binary index for the $i^{th}$ element. In certain embodiments, this binary index is created by adding one to i and representing i+1 as a binary value. The method uses a leftmost "1" of the binary index to find the slot that points to the specific block of elements containing the $i^{th}$ element. The method further uses the bits to the right of the leftmost "1" to find the $i^{th}$ element within the block of elements.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
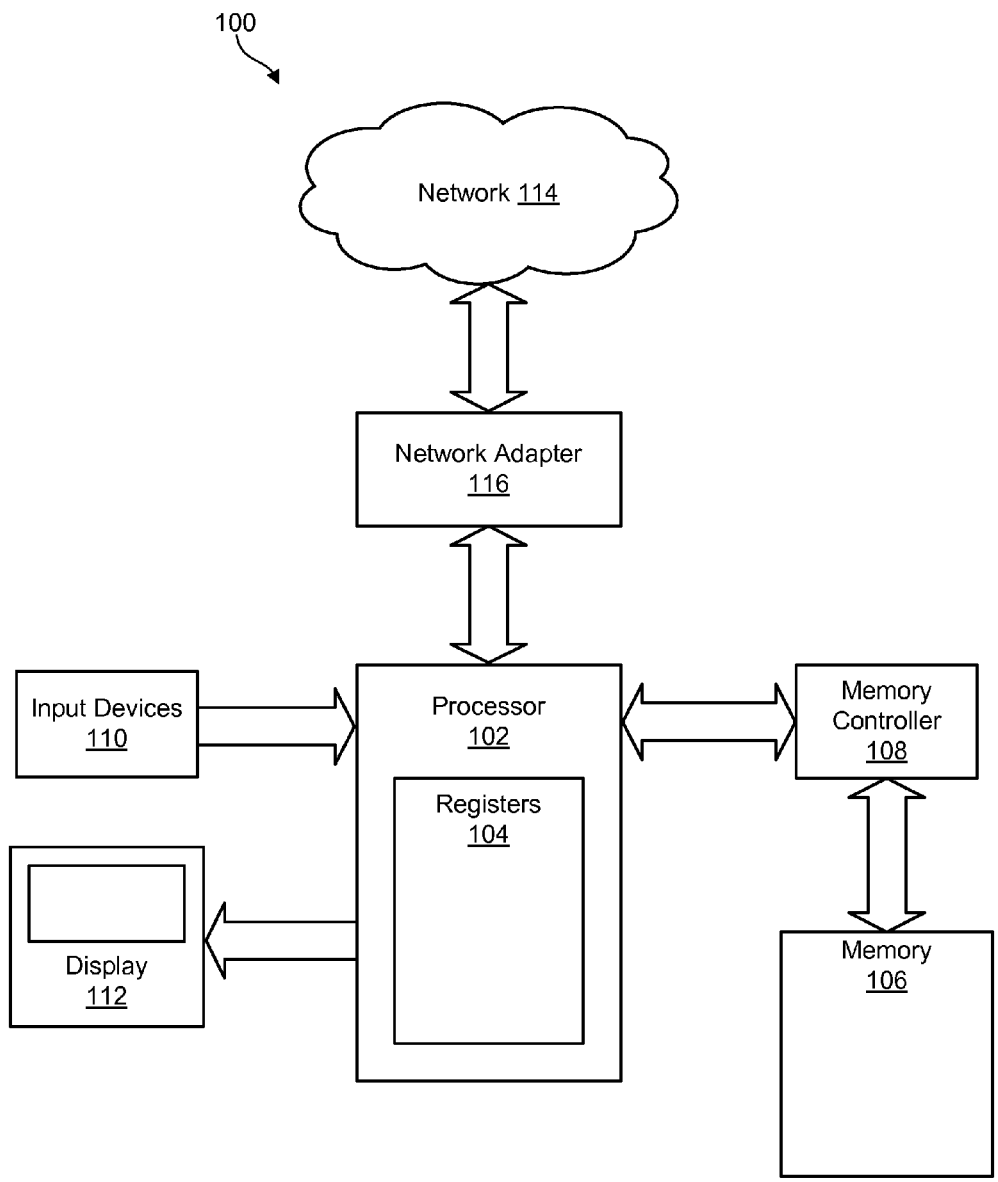
FIG. 1 is a high-level block diagram showing one example of a computer system in which a geometric array data structure in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining both software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a computer system 100 is illustrated. The computer system 100 is presented to show one example of an environment where a geometric array in accordance with the invention may be implemented. The computer system 100 is presented only by way of example and is not intended to be limiting. Indeed, the geometric array disclosed herein may be applicable to a wide variety of different computer systems in addition to the computer system 100 shown. The geometric array may also be implemented using a wide variety of programming languages and is not limited to any one programming language.

The computer system 100 includes at least one processor 102 and may include more than one processor. The processor 102 includes one or more registers 104 storing data describing the state of the processor and facilitating execution of software systems. The registers 104 may be internal to the processor 102 or may be stored in a memory 106. The memory 106 stores operational and executable data that is operated upon by the processor 102. The memory 106 may be accessed by the processor 102 by means of a memory controller 108. The memory 106 may include volatile memory (e.g., RAM) as well as non-volatile memory (e.g., ROM, EPROM, EEPROM, hard disks, flash memory, etc.).

The processor 102 may be coupled to additional devices supporting execution of software and interaction with users. For example, the processor 102 may be coupled to one or more input devices 110, such as a mouse, keyboard, touch screen, microphone, or the like. The processor 102 may also be coupled to one or more output devices such as a display device 112, speaker, or the like. The processor 102 may communicate with one or more other computer systems by means of a network 114, such as a LAN, WAN, or the Internet. Communication over the network 114 may be facilitated by a network adapter 116.

Figure 2:
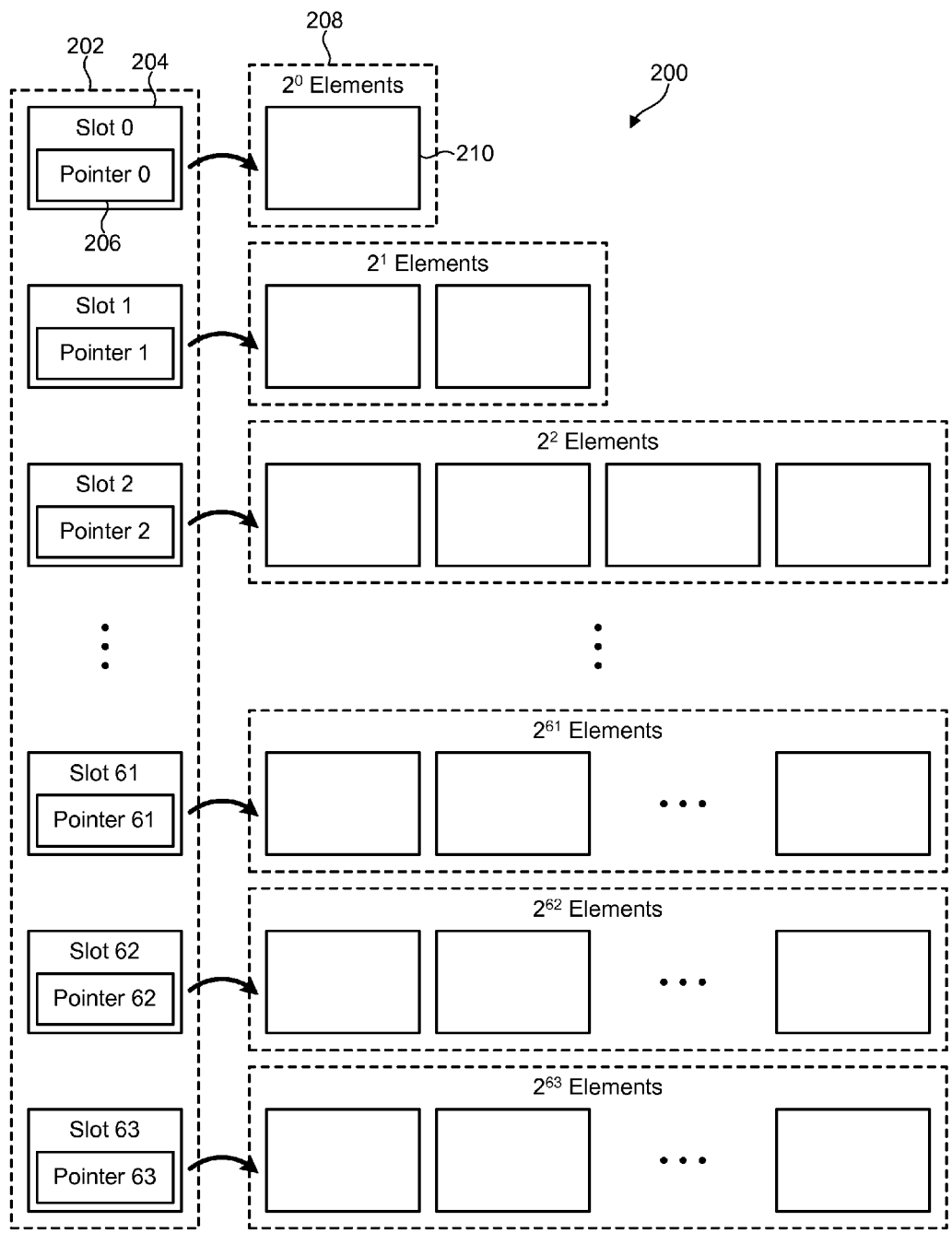
FIG. 2 is a high-level block diagram showing an example of the organization of a geometric array in accordance with the invention.

Referring to FIG. 2, a high-level block diagram showing an example of the organization of a geometric array 200 in accordance with the invention is illustrated. As shown, the geometric array 200 includes an array 202 containing a number of slots 204. Each slot 204 in the array 202 may be configured to store a pointer 206, with each pointer 206 pointing to a block 208 of elements 210. In certain embodiments, the elements 210 within a block 208 of elements 210 are contiguous in memory, whereas different blocks 208 of elements 210 are not necessarily contiguous in memory (although they may be). As shown, each block 208 of elements 210, with the exception of the first block 208 of elements 210, is twice as large as the block 208 of elements 210 associated with the preceding pointer. Thus, the geometric array 200 may grow in an exponential manner as pointers 206 to associated blocks 208 of elements 210 are added to the geometric array 200.

In the illustrated embodiment, the geometric array 200 is configured for an operating environment with 64-bit addressability. As shown, the geometric array 200 may have as many as N, or 64 slots in the array 202, where N is the size (i.e., width) of the address space. This will allow the geometric array 200 to potentially grow to $2^{64}-1$ elements, which constitutes the entire addressable space in an operating environment with 64-bit addressability. Because a geometric array 200 of such large size, or having the capacity to grow to such large size, may not always be needed, in certain embodiments the array 202 may be allocated less than N slots 204. If the maximum potential size of the geometric array 200 is known, for example, the number of slots 204 may be established to provide the desired number of elements 210. For example, if it is determined that the geometric array 200 will need at most 50 elements 210, the array 202 may be designed with 6 slots (Slots 0, 1, 2, 3, 4, and 5) to provide a maximum of 63 elements 210. Nevertheless, in other embodiments, a geometric array 200 in an operating environment with N-bit addressability may always be allocated the full N slots 204.

In certain embodiments, only a selected number of slots 204 containing pointers 206 to associated blocks 208 of elements 210 may be initially allocated to a geometric array 200. For example, if the geometric array 200 is initially allocated three slots 204 with accompanying blocks 208 of elements 210, the geometric array 200 would initially contain seven elements 210. The first slot 204 (Slot 0) would contain a pointer 206 (Pointer 0) pointing to a block 208 with one element 210, the second slot 204 (Slot 1) would contain a pointer 206 (Pointer 1) pointing to a block 208 with two elements 210, and a third slot 204 (Slot 2) would contain a pointer 206 (Pointer 2) pointing to a block 208 with four elements 210. The remaining slots 204 may contain a null value (no pointer 206) to indicate that no backing storage (i.e., blocks 208 of elements 210) have been allocated for these slots 204.

As the geometric array 200 grows and more elements 210 are needed, new blocks 208 of elements 210 may be allocated and pointers 206 to these blocks 208 of elements 210 may be stored in the slots 204. For example, if more than seven elements 210 are needed, a block 208 containing eight elements 210 (twice as large as the block 208 associated with the preceding pointer) may be allocated and a pointer 206 (Pointer 3) to this block 208 may be stored in the fourth slot 204 (Slot 3). Additional blocks 208 of elements 210 may be created and corresponding slots 204 may be populated with pointers 206 as the geometric array 200 continues to grow.

Figure 3:
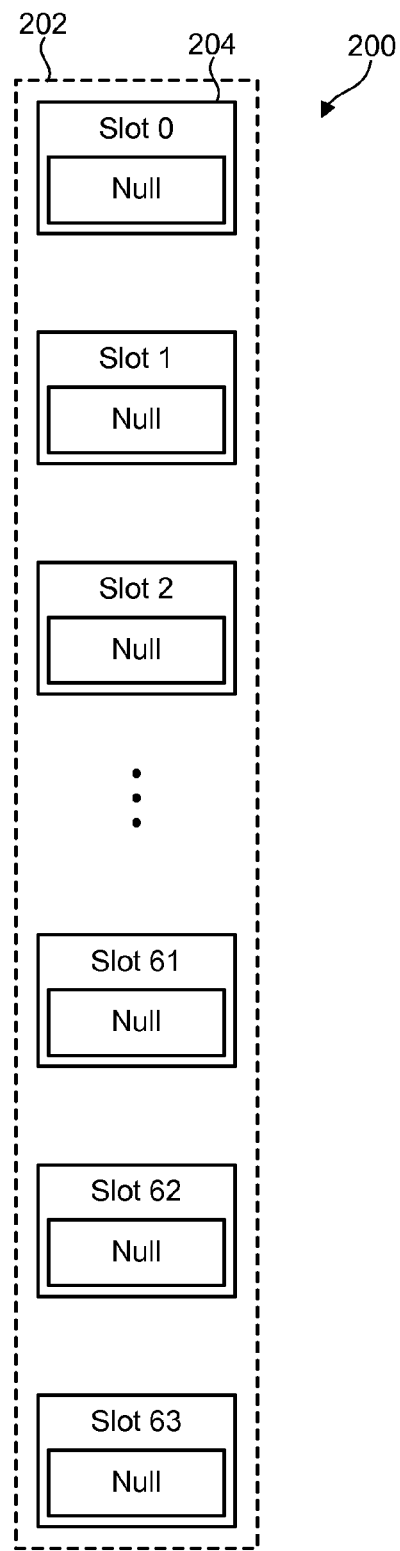
FIG. 3 is a high-level block diagram showing an empty geometric array containing zero elements.

Referring to FIG. 3, in certain embodiments, the geometric array 200 may be completely empty (have no elements 210 allocated thereto), in which case all of the array's slots 204 may contain a null value. In such a case, the geometric array 200 may only consume storage space sufficient to provide the array 202 of slots 204. This would be N slots 204 of storage space if all N slots 204 are allocated in the array 202, or some number less than N if a lesser number of slots 204 are utilized. Each slot 204 may be large enough to store an N-bit address. As storage space is needed in the geometric array 200, blocks 208 of elements 210 may be allocated and corresponding pointers 206 to these blocks 208 of elements 210 may be stored in their respective slots 204.

Figure 4:
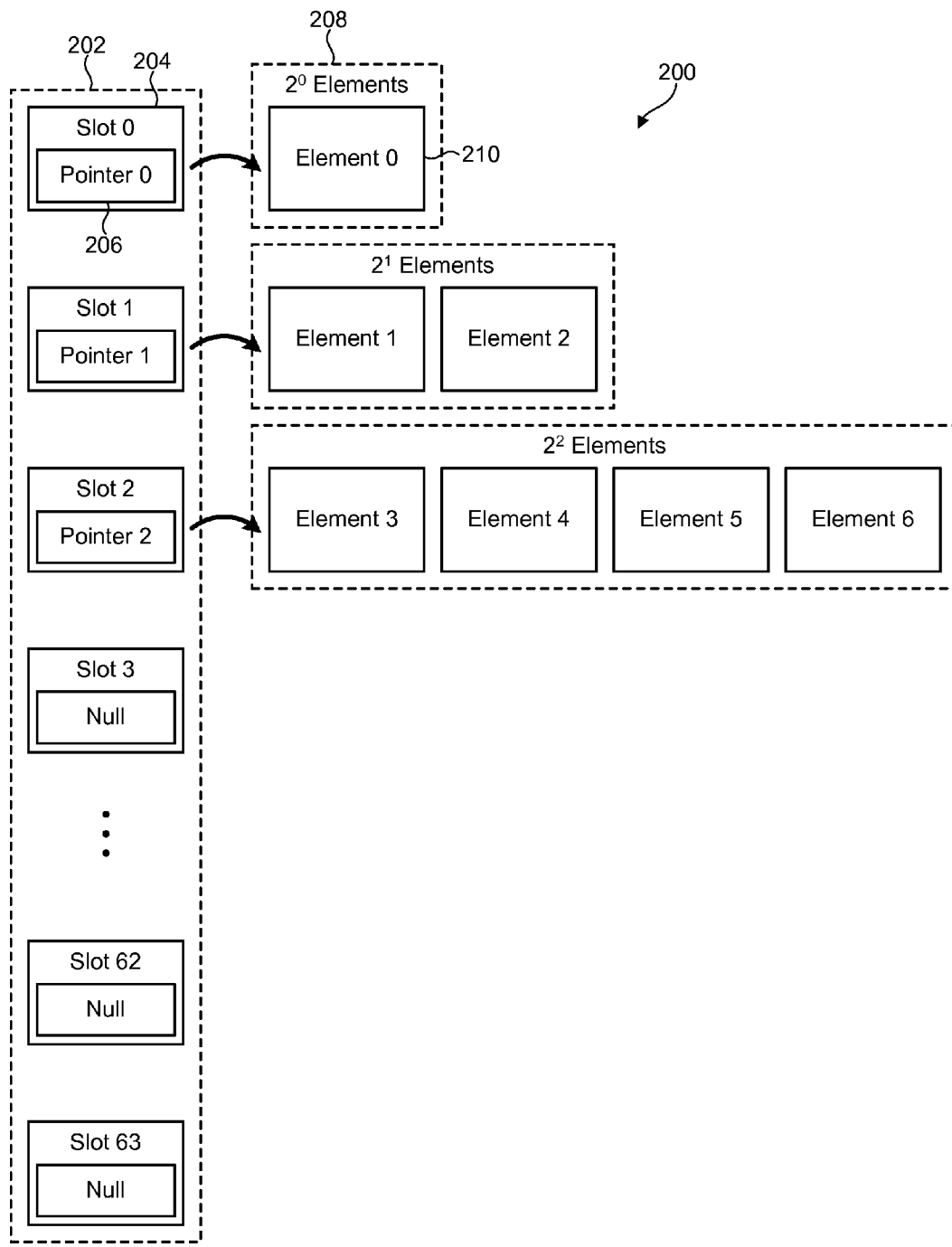
FIG. 4 is a high-level block diagram showing a geometric array containing seven elements.

Referring to FIG. 4, a high-level block diagram showing a geometric array 200 containing seven elements is illustrated. As shown, the first three slots 204 are populated with pointers 206, each pointing to a different block 208 of elements 210. Each successive block 208 of elements 210, with the exception of the first block 208 of elements 210, is twice as large as the block 208 of elements 210 associated with the preceding pointer. The remaining slots 204 contain null values to indicate that backing storage has not yet been allocated for these slots 204. This geometric array 200 will be used in the example described in association with FIG. 6.

Figure 5:
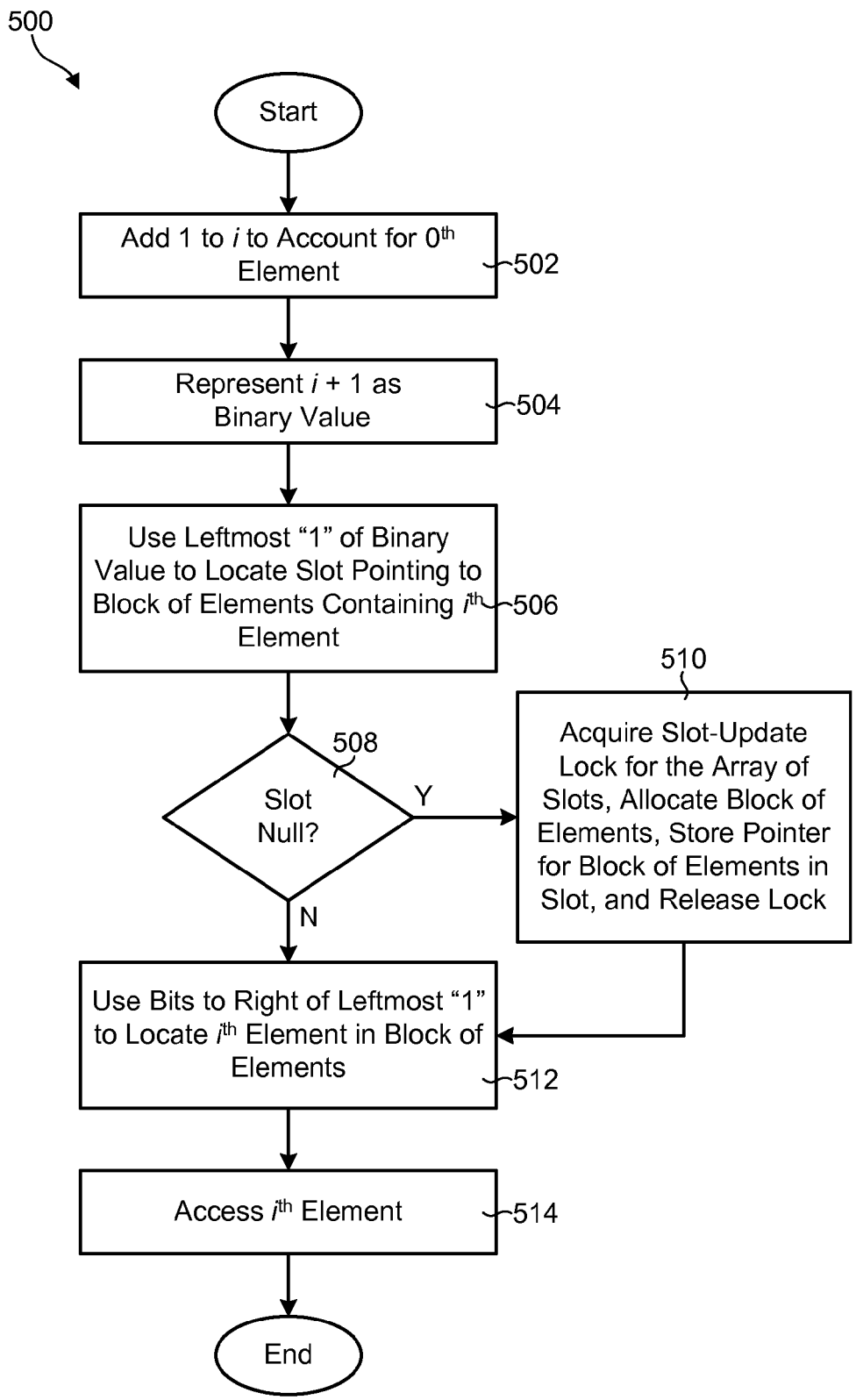
FIG. 5 is a flow chart showing one embodiment of a method for accessing the $i^{th}$ element in a geometric array in accordance with the invention.

Referring to FIG. 5, one of the advantages of the geometric array 200 described in FIGS. 2 through 4 is the ease with which elements 210 may be located and accessed (i.e., read or written to) in the geometric array 200. FIG. 5 shows one embodiment of a method 500 for locating and accessing an $i^{th}$ element in a geometric array 200. Such a method 500, for example, may be executed by a thread, operating in a multi-threaded environment, to access the $i^{th}$ element in a geometric array 200.

As shown, to locate and access the $i^{th}$ element in a geometric array 200, the method 500 initially adds 502 one to i to account for the $0^{th}$ element 210 in the geometric array 200. In other words, the step 502 is used to compensate for the illustrated naming convention, which starts with Element 0 as opposed to Element 1. For the purposes of this disclosure, the $0^{th}$ element is Element 0, the $1^{st}$ element is Element 1, the $2^{nd}$ element is Element 2, and so forth. This step 502 may be omitted or modified in cases where the naming convention is different.

The method 500 represents 504 the resulting value i+1 as a binary value. The method 500 then uses 506 the leftmost bit with a "1" value to locate the slot 204 that points to the block 208 of elements 210 containing the $i^{th}$ element. For example, if the leftmost "1" is the third bit from the right-hand side of the binary value, this indicates that the $i^{th}$ element is in the block 208 of elements 210 associated with the third slot 204 (i.e., Slot 2). The method 500 then determines 508 whether the slot 204 contains a null value. If the slot 204 contains a null value, this indicates that a block 208 of elements 210 has not yet been allocated for the slot 204.

In such a case, the thread executing the method 500 may acquire 510 a slot-update lock on the array 202 (to prevent other threads from accessing the array 202) and allocate a block 208 of elements 210 for the next empty slot 204. This may include storing 510 a pointer 206 for the block 208 of elements 210 in the slot 204. This will cause the geometric array 200 to grow by introducing a new block 208 of elements 210. The thread may then release 510 the lock.

Alternatively, instead of adding a block 208 of elements 210 at step 510, an exception may be thrown. That is, if a thread attempts to access an element 210 beyond the current end of the geometric array 200, an exception may be thrown. In such cases, an explicit "grow" operation may be required to expand the geometric array 200. Thus, a request to access an element 210 beyond the current end of the geometric array 200 may cause the geometric array 200 to grow or, alternatively, cause an exception to be thrown.

The method 500 then proceeds to step 512, where the method 500 uses the bits to the right of the leftmost "1" to locate the $i^{th}$ element in the block 208 of elements 210 associated with the slot 204 identified at step 506. These remaining bits will provide an index into the block 208 of elements 210. Thus, the leftmost "1" provides a first-dimension index (an index to the correct slot 204) of an element 210 lookup, and the remaining bits to the right provide a second-dimension index (an index into the block 208 of elements 210) of the element 210 lookup. Once the desired element 210 is located, the method 500 may access (i.e., read or write to) the $i^{th}$ element. A specific example of the method 500 using real values will be described in FIGS. 6 and 7.

Figure 6:
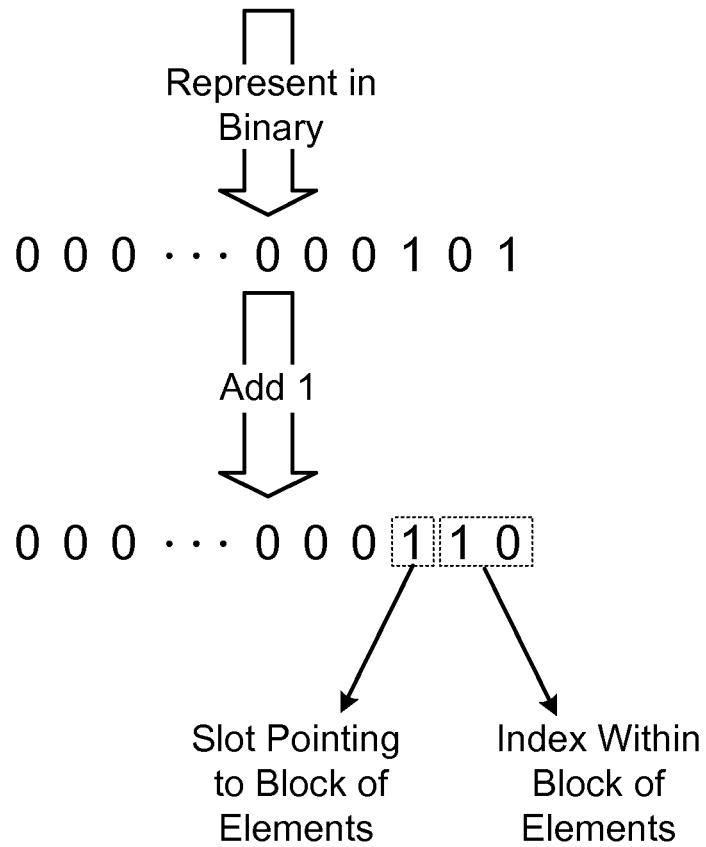
FIG. 6 shows an example of how the method of FIG. 5 may be used to find Element 5 in a geometric array containing seven elements.
Figure 7:
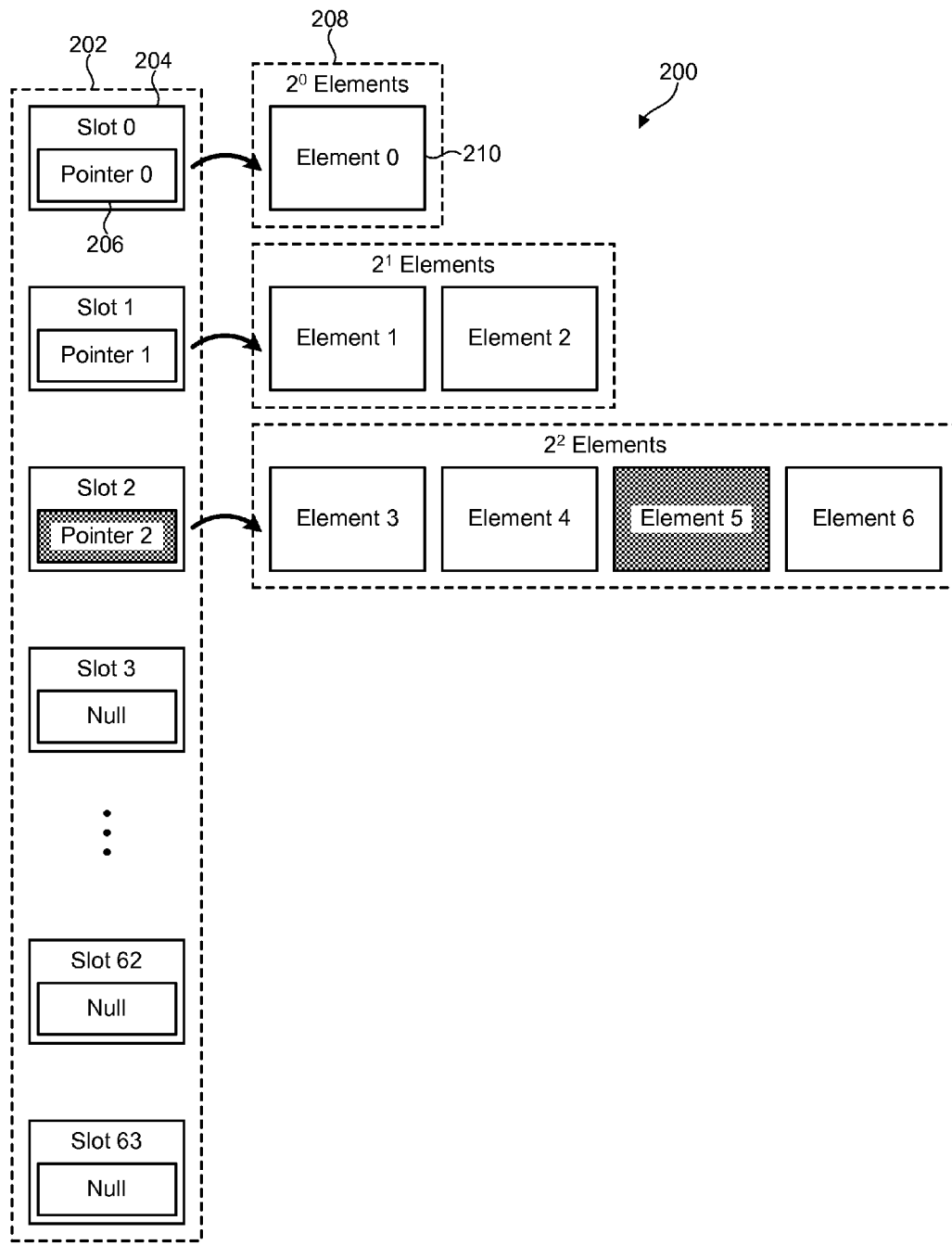
FIG. 7 is a high-level block diagram showing the location of Element 5 in a geometric array containing seven elements.

Referring to FIG. 6, an example of how the method 500 of FIG. 5 may be used to find a specific element 210 in a geometric array 200 is illustrated. For example, to find the fifth element (i.e., Element 5) in a geometric array 200 containing seven elements 210, the fifth element (i=5) is represented as the binary value (0 0 0 . . . 0 0 0 1 0 1). The value "1" is then added to the binary value i to create the binary index (0 0 0 . . . 0 0 0 1 1 0). The leftmost "1" of the binary index is used to identify the slot 204 and associated block 208 of elements 210 that contains Element 5. Because the leftmost "1" is the third bit from the right, this indicates that Element 5 is located in the block 208 of elements 210 associated with the third slot (i.e., Slot 2). The remaining bits (i.e., "1 0") provide an index into the block 208 of elements 210. Because "1 0" is equivalent to "2" in the decimal numeral system, this indicates that Element 5 is the third element (where the first element is "0") in the identified block 208 of elements 210. Thus, Element 5 is the third element of the third block 208 of elements 210 as shown by the highlighting in FIG. 7.

The geometric array 200 illustrated in FIGS. 2 through 4 is a significant advance over conventional single and multi-dimensional arrays. Because no copying of elements from old data structures to new data structures is required to expand the geometric array 200, the geometric array 200 avoids or minimizes the use of locks and other synchronization mechanisms that can hinder performance in multi-threaded environments. That is, even while expanding the geometric array 200 (by adding slots 204 and associated blocks 208 of elements 210), "get" and "put" requests may be executed on the blocks 208 of elements 210 that already exist in the geometric array 200, without requiring a lock. No movement of the top level structures (i.e., existing blocks 208 of elements 210) is required to expand the geometric array 200. A "put" request may only require a lock in the rare event that a new block 208 of elements 210 needs to be allocated to the geometric array 200 to execute the "put" request.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Some blocks may be deleted or other blocks may be added depending on the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A computer program product to implement a geometric array in a computing environment, the computer program product comprising a non-transitory computer-usable storage medium having computer-usable program code embodied therein, the computer-usable program code comprising:

computer-usable program code to generate an array of slots, each slot configured to store a pointer, wherein each pointer in the array points to a block of elements, and each pointer with the exception of the first pointer in the array points to a block of elements that is twice as large as the block of elements associated with the preceding pointer.

2. The computer program product of claim 1, wherein the elements within each block of elements are contiguous in memory.

3. The computer program product of claim 1, further comprising computer-usable program code to expand the geometric array by allocating a new block of elements that is twice as large as the block of elements associated with the preceding pointer.

4. The computer program product of claim 3, further comprising computer-usable program code to add a pointer pointing to the new block of elements to a next empty slot in the array of slots.

5. The computer program product of claim 1, wherein the number of slots in the array is equal to N, where N is the number of bits in an address space of the computing environment.

6. The computer program product of claim 1, wherein the number of slots in the array is less than N, where N is the number of bits in an address space of the computing environment.

7. The computer program product of claim 1, further comprising computer-usable program code to access the $i^{th}$ element in the geometric array by:

calculating a binary index for the $i^{th}$ element;

using a leftmost "1" of the binary index to find a slot that points to a specific block of elements containing the $i^{th}$ element; and using bits to the right of the leftmost "1" to find a specific element in the specific block of elements that is the $i^{th}$ element.

8. The computer program product of claim 7, wherein calculating the binary index for the $i^{th}$ element comprises:

adding 1 to i; and representing i+1 as a binary value to generate the binary index.

9. The computer program product of claim 1, wherein a null value in a slot indicates that no block of elements has been allocated to the slot.

* * * * *